US010861487B2

(12) United States Patent
Kawakami et al.

(10) Patent No.: US 10,861,487 B2
(45) Date of Patent: Dec. 8, 2020

(54) HIGH RECORDING DENSITY MAGNETIC RECORDING MEDIUM AND RECORDING/REPRODUCTION MECHANISM FOR THE SAME

(71) Applicant: Maxell Holdings, Ltd., Kyoto (JP)

(72) Inventors: Shinji Kawakami, Kyoto (JP); Toshio Kawakita, Kyoto (JP); Masao Fujita, Kyoto (JP)

(73) Assignee: Maxell Holdings, Ltd., Kyoto (JP)

( * ) Notice: Subject to any disclaimer, the term of this patent is extended or adjusted under 35 U.S.C. 154(b) by 268 days.

(21) Appl. No.: 15/997,457

(22) Filed: Jun. 4, 2018

(65) Prior Publication Data
US 2018/0350398 A1 Dec. 6, 2018

(30) Foreign Application Priority Data

Jun. 5, 2017 (JP) ................................. 2017-111038
May 10, 2018 (JP) ................................. 2018-091690

(51) Int. Cl.
*G11B 5/39* (2006.01)
*G11B 5/70* (2006.01)
(Continued)

(52) U.S. Cl.
CPC .............. *G11B 5/3909* (2013.01); *G11B 5/68* (2013.01); *G11B 5/70* (2013.01); *G11B 5/70642* (2013.01); *G11B 5/714* (2013.01); *G11B 5/82* (2013.01)

(58) Field of Classification Search
None
See application file for complete search history.

(56) References Cited

U.S. PATENT DOCUMENTS 4,590,119 A * 5/1986 Kawakami ........... G11B 5/7305
360/134
4,985,537 A * 1/1991 Utsumi ................. B29C 55/143
264/235.8
(Continued)

FOREIGN PATENT DOCUMENTS

DE       2942507 A1 * 5/1980 ........... G11B 5/7305
JP  2008-128672 A    6/2008
(Continued)

OTHER PUBLICATIONS

JPO Abstract Translation of JP 2013-103361 A (Year: 2013).*
Derwent Abstract Translation of DE 2942507 A1 (Year: 1980).*

*Primary Examiner* — Kevin M Bernatz
(74) *Attorney, Agent, or Firm* — Birch, Stewart, Kolasch & Birch, LLP

(57) ABSTRACT

A refractive index nL and an attenuation rate kL of a magnetic layer are obtained by irradiating linearly polarized light at an irradiation angle of 70° from a lengthwise direction of the magnetic layer to the surface of the magnetic layer, and a vertical reflectance RL during vertical incidence of the linearly polarized light in the lengthwise direction is obtained based on nL and kL. A refractive index nT and an attenuation rate kT of the magnetic layer are obtained by irradiating linearly polarized light at an irradiation angle of 70° from a width direction of the magnetic layer to the surface of the magnetic layer, and a vertical reflectance RT during vertical incidence of the linearly polarized light in the width direction is obtained from nT and kT. If a variation rate A (%) of RL and RT is $A=|RL/RT-1|\times 100$, the relationship $A \leq 10\%$ is established.

8 Claims, 1 Drawing Sheet

(51) Int. Cl.
*G11B 5/706* (2006.01)
*G11B 5/82* (2006.01)
*G11B 5/714* (2006.01)
*G11B 5/68* (2006.01)

(56) References Cited

U.S. PATENT DOCUMENTS

| | | | |
|---|---|---|---|
| 8,742,058 B2 * | 6/2014 | Horie | B29C 55/12 |
| | | | 528/308.1 |
| 2012/0045664 A1 * | 2/2012 | Tanaka | G11B 5/70615 |
| | | | 428/840.2 |
| 2014/0212693 A1 | 7/2014 | Hattori | |
| 2015/0093600 A1 | 4/2015 | Hosoya | |
| 2015/0111066 A1 * | 4/2015 | Terakawa | G11B 5/70 |
| | | | 428/836.2 |
| 2016/0104560 A1 | 4/2016 | Ohkoshi et al. | |
| 2017/0162220 A1 * | 6/2017 | Nakashio | G11B 5/70642 |
| 2018/0208479 A1 * | 7/2018 | Sakane | C01G 51/40 |
| 2019/0295587 A1 * | 9/2019 | Kasada | G11B 5/00813 |
| 2020/0035265 A1 * | 1/2020 | Kasada | G11B 5/00813 |

FOREIGN PATENT DOCUMENTS

| | | | |
|---|---|---|---|
| JP | 2009-53103 A | | 3/2009 |
| JP | 2012-43495 A | | 3/2012 |
| JP | 2013103361 A | * | 5/2013 |
| JP | 2014-149886 A | | 8/2014 |
| JP | 2014-224027 A | | 12/2014 |
| JP | 2015-82329 A | | 4/2015 |
| JP | 2015-91747 A | | 5/2015 |

* cited by examiner

HIGH RECORDING DENSITY MAGNETIC RECORDING MEDIUM AND RECORDING/REPRODUCTION MECHANISM FOR THE SAME

BACKGROUND OF THE INVENTION

1. Field of the Invention

The present invention relates to a high recording density magnetic recording medium with an excellent electromagnetic conversion property, and to a recording/reproduction mechanism for the high recording density magnetic recording medium.

2. Description of Related Art

A coating-type magnetic recording medium provided with a magnetic layer containing magnetic powder and a binder on a nonmagnetic support body needs to have a higher recording density accompanying the transition of a recording/reproduction method from an analog method to a digital method. In particular, a high-density digital video tape, a computer backup tape, and the like need to satisfy this increasing demand.

A recording wavelength is shortened accompanying such an increase in the recording density, and in order to support this short wavelength recording, attempts have been made to micronize magnetic powder year by year, and currently, ferromagnetic hexagonal ferrite powder having an average particle diameter of about 20 nm has been realized, and a magnetic recording medium using this magnetic powder has been practically used (for example, JP 2015-91747A).

Moreover, in order to further increase the recording density of the magnetic recording medium using the above-described ferromagnetic hexagonal ferrite powder, the ferromagnetic hexagonal ferrite powder needs to be further micronized. However, the volume of magnetic powder particles is reduced by further micronizing the ferromagnetic hexagonal ferrite powder, and there is a problem that the ferromagnetic hexagonal ferrite powder particles tend to be influenced by heat fluctuation. Thus, it is necessary to suppress heat fluctuation using a magnetic material having a high magnetic coercive force and a high anisotropy energy even though the magnetic material is micronized.

In such a circumstance, in recent years, $\varepsilon\text{-Fe}_2\text{O}_3$ has been studied as a new magnetic material for a magnetic recording medium, and iron oxide nano-magnetic particle powder constituted by a single phase of $\varepsilon\text{-Fe}_2\text{O}_3$ having a ferromagnetic property and having an average particle diameter of 15 nm or less or preferably 10 nm or less has been proposed (e.g., JP 2014-224027A). Also, a magnetic recording medium using $\varepsilon\text{-Fe}_2\text{O}_3$ as the magnetic powder has been proposed (e.g., JP 2014-149886A, JP 2015-82329A).

Also, JP 2012-43495A, which relates to a method for measuring spacing, JP 2008-128672A, which relates to a method for measuring layer thickness, and JP 2009-53103A, which relates to a method for evaluating an optical property of a surface of a magnetic layer, are prior art documents relating to the present invention.

The track density of a magnetic layer has been increased accompanying such a high recording density for increasing the capacity of a magnetic recording medium. However, the track width decreases accompanying an increase in the track density, and as a result, there is a problem in that the output property decreases and the electromagnetic conversion property also decreases.

Also, a multi-channel head having multiple head elements is used in a computer backup tape, but as the capacity has increased over generations, the number of channels has increased in order to improve the speed of accessing data, and LTO 7, which is the newest generation of the LTO format, has 32 channels. Under this circumstance, if the tracks become narrower, variation in the output properties between the channels of the magnetic head also increases, and therefore it is necessary to reduce deviation in the output property between the head-channels in order to obtain a highly-reliable and high-capacity computer backup tape.

The present invention has been made in order to solve these problems, and provides a high recording density magnetic recording medium that has an excellent electromagnetic conversion property even when track density increases accompanying an increase in the recording density.

SUMMARY OF THE INVENTION

A high recording density magnetic recording medium of the present invention is a high recording density magnetic recording medium comprising a nonmagnetic support body and a magnetic layer including magnetic particles, wherein an average particle diameter of the magnetic particles is 17 nm or less, a refractive index nL and an attenuation rate kL of the magnetic layer are obtained by irradiating linearly polarized light at an irradiation angle of 70° from a lengthwise direction of the magnetic layer to the surface of the magnetic layer, and a vertical reflectance RL during vertical incidence of the linearly polarized light in the lengthwise direction is obtained from nL and kL, a refractive index nT and an attenuation rate kT of the magnetic layer are obtained by irradiating linearly polarized light at an irradiation angle of 70° from a width direction of the magnetic layer to the surface of the magnetic layer, and a vertical reflectance RT during vertical incidence of the linearly polarized light in the width direction is obtained from nT and kT, and if a variation rate A (%) of RL and RT is A=|RL/RT−1|×100, a relationship A≤10% is established.

The recording/reproduction mechanism for the high recording density magnetic recording medium of the present invention includes the high recording density magnetic recording medium of the present invention and a TMR head.

According to the present invention, it is possible to provide a high recording density magnetic recording medium that has an excellent electromagnetic conversion property even if the track width decreases due to the track density increasing accompanying an increase in the recording density for increasing the capacity.

DETAILED DESCRIPTION OF THE INVENTION

High Recording Density Magnetic Recording Medium

Figure 1:
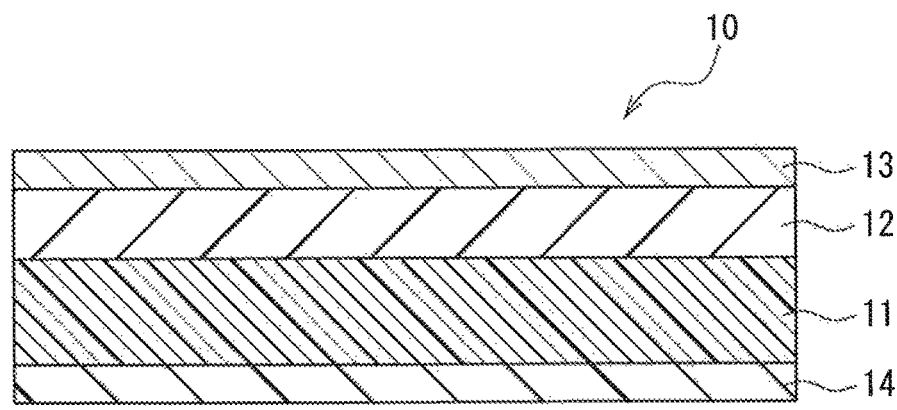
FIG. 1 is a schematic cross-sectional view showing an example of a magnetic recording medium.

An embodiment of a high recording density magnetic recording medium of the present invention will be described hereinafter.

The high recording density magnetic recording medium (hereinafter also referred to simply as "magnetic recording medium") of the present invention includes a nonmagnetic support body and a magnetic layer including magnetic particles, the average particle diameter of the magnetic particles being 17 nm or less. Also, linearly polarized light is irradiated at an irradiation angle of 70° to a surface of the magnetic layer from the lengthwise direction of the magnetic layer to obtain a refractive index nL and an attenuation coefficient kL of the magnetic layer, and a vertical reflectance RL during vertical incidence of the linearly polarized light in the lengthwise direction is obtained from nL and kL. Furthermore, linearly polarized light is irradiated at an irradiation angle of 70° to a surface of the magnetic layer from the width direction of the magnetic layer to obtain a refractive index nT and an attenuation coefficient kT of the magnetic layer, and a vertical reflectance RT during vertical incidence of the linearly polarized light in the width direction is obtained from nT and kT. If a variation rate A (%) of RL and RT is set as $A=|RL/RT-1|\times100$, a relationship in which $A\leq1.0\%$ is established.

In the magnetic recording medium of the present embodiment, the average particle diameter of the above-described magnetic particles is 17 nm or less and the variation rate A is 10% or less, and thus it is possible to secure a sufficient number of minute magnetic particles and to obtain a uniform distribution state of the magnetic particles in the lengthwise direction and the width direction of the magnetic layer. Accordingly, it is possible to obtain a favorable electromagnetic conversion property (SN property) even if the track width decreases due to the track density increasing accompanying an increase in the recording density for increasing the capacity.

In particular, with the magnetic recording medium of the present embodiment, a sufficient number of minute magnetic particles and a uniform distribution state of the magnetic particles are obtained in the width direction of the magnetic layer, and therefore even if a multi-channel head is used on a magnetic layer having a narrow track width of 1 μm or less, deviation in the output property between the head-channels can be reduced.

That is, in the conventional technique, the track width has been 10 or more times longer than the recording bit length (half recording wavelength) in a storage drive of a magnetic recording medium (e.g., magnetic tape), but the track width needs to be reduced in order to increase the recording density, and in such a case, the track width is 1 μm or less and the track width is less than 10 times the recording bit length. When the track width is reduced in this manner, minute magnetic field disturbance results in noise, and therefore in order to keep the SN property favorable, a sufficient number of magnetic particles need to be distributed uniformly in the lengthwise direction and the width direction of the magnetic layer. In the present embodiment, the average particle diameter of the magnetic particles is set to 17 nm or less and the variation rate A is set to 10% or less, and thus it is possible to uniformly distribute a sufficient number of minute magnetic particles in the lengthwise direction and the width direction of the magnetic layer.

If the length of magnetization of the signal recorded in the magnetic layer, which is the length of magnetization in the width direction of the magnetic layer, is set to 1 μm or less, the magnetic recording medium of the present embodiment is preferably reproduced using a tunneling magnetoresistance head (TMR head). Even if the length of magnetization is set to 1 μm or less in order to increase the track density of the magnetic layer, it is possible to obtain a high SN ratio by performing reproduction with a highly-sensitive TMR head.

The length of the magnetization can be measured as follows, for example. That is, the length of the magnetization in the width direction of the magnetic layer on which signals are recorded is measured using a frequency detection method and "Nano Scope III" (product name) manufactured by Digital Instruments Corporation as the magnetic force microscope. A probe having a cobalt alloy coating (the radius of curvature of the tip: 25 to 40 nm, magnetic coercive force: about 400 [Oe], magnetic moment: about $1\times10^{-13}$ emu) is used as the measurement probe, the scanning range is 5 μm×5 μm, and the scanning speed is 5 μm/sec.

Also, it is preferable that $0.0013\ \mu T\cdot m<Mr\cdot t<0.0032\ \mu T\cdot m$ is satisfied, where the residual magnetic flux density in the thickness direction of the magnetic layer is Mr and the average thickness of the magnetic layer is t, and furthermore, it is preferable that the squareness ratio in the thickness direction of the magnetic layer is set to 0.65 or more. Accordingly, the resolution of recording magnetization improves, and therefore it is possible to obtain a more preferable electromagnetic conversion property (SN property) even if the track width is set to 1 μm or less. Furthermore, it is more preferable that $0.0020\ \mu T\cdot m<Mr\cdot t<0.0030\ \mu T\cdot m$ is satisfied, and it is more preferable that the squareness ratio is 0.75 or more.

Furthermore, the magnetic particles are preferably composed of ε-iron oxide. Due to using ε-iron oxide particles as the magnetic particles, the magnetic coercive force of the magnetic particles does not decrease even if the average particle diameter of the magnetic particles is set to 17 nm or less in order to set the track width to 1 μm or less.

The ε-iron oxide is normally composed of spherical particles, but there is no limitation to spherical particles, and approximately spherical particles or ellipsoid particles may be used.

Also, the average particle diameter of the magnetic particles composed of the ε-iron oxide is preferably set to 15 nm or less in order to be further compatible with short wavelength recording. Furthermore, the average particle diameter of the magnetic particles composed of the above-described ε-iron oxide is more preferably 12 nm or less. The lower limit value of the average particle diameter of the magnetic particles composed of the ε-iron oxide is normally about 8 nm. This is because ε-iron oxide with an average particle diameter of less than 8 nm is not easy to manufacture.

A magnetic coercive force in the thickness direction of the magnetic layer is preferably 3000 oersteds [Oe] or more. This is because by setting the magnetic coercive force to 3000 oersteds [Oe] or more, self demagnetization loss is low and a high reproduction output can be obtained even in a short wavelength recording region at a high recording density.

Also, when spacing on the surface of the magnetic layer is measured using a TSA (tape spacing analyzer) after the surface of the magnetic layer is cleaned using n-hexane, a value of the spacing is preferably 5 nm or more and 12 nm or less. If the value of the spacing is lower than 5 nm, the surface of the magnetic layer tends to become excessively smooth, the area of contact between the magnetic head and the magnetic layer tends to increase, a friction coefficient tends to increase, and the durability of the magnetic layer tends to decrease. On the other hand, if the value of the spacing exceeds 12 nm, the distance between the magnetic head and the surface of the magnetic layer tends to increase excessively, and the recording/reproduction property tends to decrease. The value of the spacing is more preferably 7 nm or more and 12 nm or less, and most preferably 8 nm or more and 11 nm or less.

Although there is no particular limitation on a method for measuring the value of the spacing and a method for controlling the same, measurement and controlling can be performed using a method disclosed in JP 2012-43495A, for example.

The thickness of the magnetic layer is preferably 30 nm or more and 200 nm or less. Short wavelength recording properties can be improved by setting the thickness of the magnetic layer to 200 nm or less, and a servo signal can be recorded by setting the thickness of the magnetic layer to 30 nm. If ε-iron oxide particles are used as the magnetic particles of the present embodiment, the saturation magnetization amount of the ε-iron oxide particles is ½ to ⅓ smaller than the saturation magnetization amount of the conventional ferromagnetic hexagonal ferrite particles, and therefore if a servo signal with a long recording wavelength is recorded, the thickness of the magnetic layer needs to be 30 nm or more.

If the servo signal is not recorded in the magnetic layer, the thickness of the magnetic layer is preferably 10 nm or more and 50 nm or less. Even if the thickness of the magnetic layer is 10 nm or more and 50 nm or less, it is possible to perform recording and reproduction of a data signal using a highly-sensitive magnetic head such as a TMR head.

Although the method for measuring the average thickness of the magnetic layer is not particularly limited, it can be performed using the method disclosed in JP 2008-128672A.

Hereinafter, the magnetic recording medium of the present embodiment will be described based on the drawings. FIG. 1 is a schematic cross-sectional view showing an example of the magnetic recording medium of the present embodiment.

In FIG. 1, a magnetic recording medium 10 of the present embodiment is a magnetic tape including a nonmagnetic support body 11, an undercoat layer 12 formed on one main surface (upper surface herein) of the nonmagnetic support body 11, and a magnetic layer 13 formed on a main surface (upper surface herein) of the undercoat layer 12 that is opposite to the nonmagnetic support body 11 side. Also, the main surface (lower surface) of the nonmagnetic support body 11 on which the undercoat layer 12 is not formed is provided with a back coat layer 14.

Magnetic Layer

The magnetic layer 13 includes magnetic particles and a binder. The magnetic particles are preferably ε-iron oxide particles.

The ε-iron oxide particles are preferably formed by a single phase expressed by a general composition formula $ε-Fe_2O_3$. This is because if ε-iron oxide or γ-iron oxide is mixed in, the magnetic coercive force of the magnetic layer decreases. However, α-iron oxide and γ-iron oxide may be included as impurities as long as the magnetic coercive force of the magnetic layer does not decrease.

Also, in the present embodiment, the ε-iron oxide and the α-iron oxide and γ-iron oxide can be identified by analyzing the crystal structures thereof through X-ray diffraction.

The magnetic coercive force of the ε-iron oxide particles is preferably 3000 oersteds [Oe] or more. Thus, the magnetic coercive force in the thickness direction of the magnetic layer can be set to 3000 oersteds [Oe] or more. Also, if impurities are contained in the ε-iron oxide particles expressed by the general composition formula $ε-Fe_2O_3$, the magnetic coercive force of the ε-iron oxide particles decreases, and therefore the impurities are preferably not included. However, the magnetic coercive force of the ε-iron oxide particles can be controlled by replacing a portion of the Fe sites of the crystals with trivalent metal elements such as aluminum (Al), gallium (Ga), rhodium (Rh), and indium (In). For this reason, the ε-iron oxide particles may contain metal elements other than iron as impurities, as long as a magnetic coercive force of 3000 oersteds [Oe] or more can be maintained.

The upper limit value of the magnetic coercive force of the ε-iron oxide particles is not particularly limited, but about 4000 oersteds [Oe] is preferable in the case of recording a servo signal with a long recording wavelength.

As described above, the average particle diameter of the ε-iron oxide particles contained in the magnetic layer is set to 17 nm or less. If the average particle diameter of the ε-iron oxide particles exceeds 17 nm, noise of the magnetic recording medium increases in short wavelength recording in particular, and therefore a high electromagnetic conversion property tends not to be obtained. The lower limit value of the average particle value of the ε-iron oxide particles is preferably small from the viewpoint of short wavelength recording, but since it is difficult to disperse the ε-iron oxide particles to primary particles if the average particle diameter is too small, the lower limit value of the average particle diameter is preferably about 5 nm.

In the present embodiment, the average particle diameter of magnetic particles included in the magnetic layer was determined as follows using 100 magnetic particles in one field of view using a photograph obtained by imaging the surface of the magnetic layer with an acceleration voltage of 2 kV, 10000-fold (10 k-fold) magnification, and an observation condition of U-LA100, using a scanning electron microscope (SEM) "S-4800" manufactured by HITACHI Ltd.

If the particles have a needle shape, the average particle diameter is determined by calculating an average long axial diameter of 100 particles, if the particles have a plate shape, the average particle diameter is determined by calculating an average maximum plate diameter of 100 particles, and if the particles are spherical or an ellipsoidal shape in which a ratio of the longer axis length to the shorter axis length is 1 to 3.5, the average particle diameter is determined by calculating an average maximum diameter of 100 particles.

A conventionally known thermoplastic resin, thermosetting resin, or the like can be used as the binder included in the magnetic layer 13. Specifically, examples of the above-described thermoplastic resin include a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, and a polyester polyurethane resin. Also, specific examples of the above-described thermosetting resin include a phenol resin, an epoxy resin, a polyurethane resin, a urea resin, a melamine resin, and an alkyd resin.

The content of the binder in the magnetic layer 13 is preferably 7 to 50 parts by mass and more preferably 10 to 35 parts by mass with respect to 100 parts by mass of magnetic particles.

Also, it is preferable to use a thermosetting crosslinking agent that binds to functional groups or the like included in the binder and forms a crosslinking structure in combination with the binder. Specific examples of the above-described crosslinking agent include isocyanate compounds such as tolylene diisocyanate, hexamethylene diisocyanate, and isophorone diisocyanate; reaction products of an isocyanate compound and a compound having a plurality of hydroxyl groups such as trimethylolpropane; and various polyisocyanates such as condensation products of isocyanate compounds. The content of the above-described crosslinking agent is preferably 10 to 50 parts by mass with respect to 100 parts by mass of the binder.

The magnetic layer 13 may further contain an additive such as a polishing agent, a lubricant, or a dispersing agent, as long as the magnetic layer 13 contains the above-described magnetic particles and binder. In particular, from the viewpoint of durability, a polishing agent and a lubricant are preferably used.

Specific examples of the polishing agent include α-alumina, β-alumina, silicon carbide, chromium oxide, cerium oxide, α-iron oxide, corundum, artificial diamond, silicon nitride, titanium carbide, titanium oxide, silicon dioxide, and boron nitride, and among these, a polishing agent having a Mohs' hardness of 6 or more is more preferable. The polishing agents may be used alone or in combination. Although the average particle diameter of the polishing agent depends on the type of the polishing agent to be used, it is preferably 10 to 200 nm. The content of the above-described polishing agent is preferably 5 to 20 parts by mass and more preferably 8 to 18 parts by mass with respect to 100 parts by mass of the magnetic particles.

Examples of the above-described lubricant include fatty acids, fatty acid esters, and fatty acid amides. Although the above-described fatty acids may be any of linear fatty acids, branched fatty acids, and cis/trans isomers, a linear fatty acid having excellent lubricant performance is preferable. Specific examples of such fatty acids include lauric acid, myristic acid, stearic acid, palmitic acid, behenic acid, oleic acid, and linoleic acid. Specific examples of the above-described fatty acid ester include n-butyl oleate, hexyl oleate, n-octyl oleate, 2-ethylhexyl oleate, oleyl oleate, n-butyl laurate, heptyl laurate, n-butyl myristate, n-butoxyethyl oleate, trimethylolpropane trioleate, n-butyl stearate, s-butyl stearate, isoamyl stearate, and butyl cellosolve stearate. Specific examples of the above-described fatty acid amide include palmitic acid amide and stearic acid amide. These lubricants may be used alone or in combination.

Among these, it is preferable to use a fatty acid ester and a fatty acid amide in combination. In particular, it is preferable to use 0.2 to 3 parts by mass of a fatty acid ester and 0.5 to 5 parts by mass of a fatty acid amide with respect to 100 parts by mass of the total solid content such as magnetic particles and polishing agents in the magnetic layer 13. This is because if the content of the above-described fatty acid ester is less than 0.2 parts by mass, the friction coefficient reduction effect is small, and if the content thereof exceeds 3.0 parts by mass, there is a risk that side effects such as the magnetic layer 13 attaching to the head will occur. Also, this is because if the content of the above-described fatty acid amide is less than 0.5 parts by mass, the effect of preventing seizing caused by mutual contact between the magnetic head and the magnetic layer 13 is small, and if the content thereof exceeds 5 parts by mass, there is a risk that the fatty acid amide will undergo bleedout.

Also, the magnetic layer 13 may contain carbon black for the purpose of increasing the conductivity and surface lubricity. Specific examples of such carbon black include acetylene black, furnace black, and thermal black. The average particle diameter of carbon black is preferably 0.01 to 0.1 μm. If the above-described average particle diameter is 0.01 μm or more, it is possible to form the magnetic layer 13 in which carbon black is well dispersed. On the other hand, if the above-described average particle diameter is 0.1 μm or less, it is possible to form the magnetic layer 13 having excellent surface smoothness. Also, two or more types of carbon black having different average particle diameters may be used as needed. The content of the above-described carbon black is preferably 0.2 to 5 parts by mass and more preferably 0.5 to 4 parts by mass with respect to 100 parts by mass of magnetic particles.

It is preferable that a center-line average surface roughness Ra of the magnetic layer 13 is less than 2.0 nm, the center-line average surface roughness being defined in Japanese Industrial Standard (JIS) B0601. The more the surface smoothness of the magnetic layer 13 increases, the higher the output that can be obtained is, but if the surface of the magnetic layer 13 is excessively smoothened, the friction coefficient becomes high and the travel stability decreases. Thus, Ra is preferably 1.0 nm or more.

Next, the surface state of the magnetic layer 13 will be described. The inventors of the present application found that the orientation and the dispersion degree of the needle-shaped magnetic particles in the magnetic layer can be evaluated by evaluating the optical properties of the surface of the magnetic layer, and a coating layer evaluation method has been proposed in JP 2009-53103A. Furthermore, as a result of intensive studies evaluating the optical property of the surface of the magnetic layer using not only needle-shaped, but also spherical and plate-shaped minute magnetic articles, the inventors of the present application found that in the case where linearly polarized light is irradiated to a surface of the magnetic layer from the lengthwise direction of the magnetic layer at an irradiation angle of 70° to obtain a refractive index nL and an attenuation coefficient kL of the magnetic layer and a vertical reflectance RL during vertical incidence of the linearly polarized light in the lengthwise direction is obtained from nL and kL, and in the case where linearly polarized light is irradiated to a surface of the magnetic layer from the width direction of the magnetic layer at an irradiation angle of 70° to obtain a refractive index nT and an attenuation coefficient kT of the magnetic layer and a vertical reflectance RT during vertical incidence of the linearly polarized light in the width direction is obtained from nT and kT, and the variation rate A (%) of RL and RT is $A=|RL/RT-1|\times 100$, then variation in the shape, such as the sphericity of the magnetic particles in the magnetic layer, orientation, dispersion degree depending on aggregation and the like of the magnetic particles, and the like influence the variation rate A. As a result of further studies based on this, the inventors of the present application found that a uniform distribution state of the magnetic particles can be obtained by setting the variation rate A to 10% or less.

Regarding the variation rate A (%), RL/RT indicates the ratio of the vertical reflectance RL of the linearly polarized light in the lengthwise direction, with respect to the vertical reflectance RT of the linearly polarized light in the width direction. The closer this ratio is to 1, the more equal the vertical reflectance of the linearly polarized light in the width direction and the vertical reflectance of the linearly polarized light in the lengthwise direction are. This means that variation in the shape, such as the sphericity of the magnetic particles in the magnetic layer, orientation, the distribution degree depending on aggregation and the like of the magnetic particles, and the like have little variation in the lengthwise direction and the width direction of the magnetic layer. Accordingly, this means that the closer the value of A=|RL/RT−1|×100 is to 0%, the smaller the variation in the surface state in the lengthwise direction and the width direction of the magnetic layer is, which is preferable. However, it is difficult to technically set the variation rate A to 0%, and the lower limit value of the variation rate A is about 0.5%.

In order to calculate the vertical reflectance R during vertical incidence based on the refractive indices nL and nT of the magnetic layer and the attenuation coefficients kL and kT, it is possible to use the following equation, where n is the refractive index and k is the attenuation coefficient.

$$R=[(n-1)^2+k^2]/[(n+1)^2+k^2]$$

Figure 2:
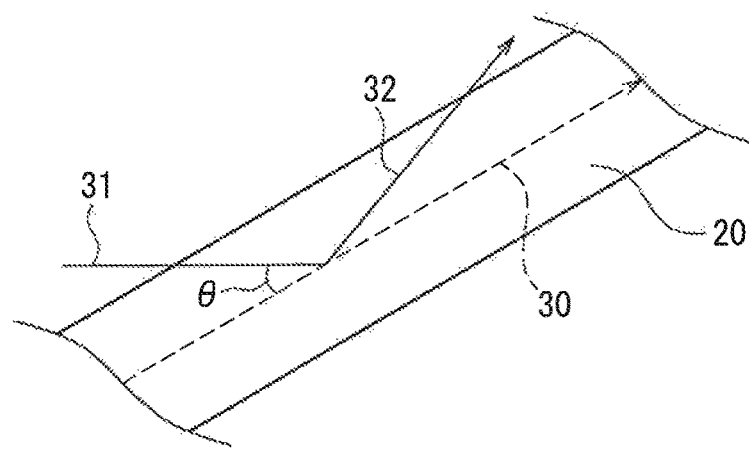
FIG. 2 is a schematic perspective view showing reflection of linearly polarized light incident in a lengthwise direction of a magnetic layer.
Figure 3:
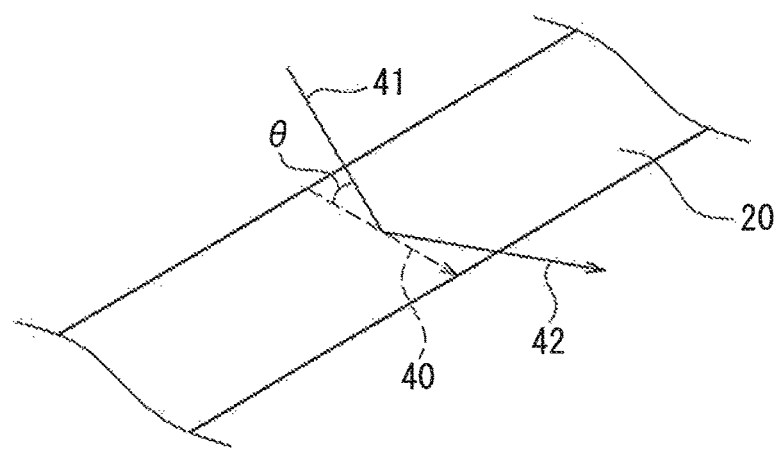
FIG. 3 is a schematic perspective view showing reflection of linearly polarized light incident in a width direction of a magnetic layer.

FIG. 2 is a schematic perspective view showing reflection of linearly polarized light incident in a lengthwise direction of a magnetic layer, and FIG. 3 is a schematic perspective view showing reflection of linearly polarized light incident in a width direction of a magnetic layer. FIG. 2 shows reflected light 32 at a time of irradiating linearly polarized light 31 at an irradiation angle θ of 70° in a lengthwise direction 30 of a magnetic layer 20 to a surface of the magnetic layer 20. Also, FIG. 3 shows reflected light 42 at a time of irradiating linearly polarized light 41 at an irradiation angle θ of 70° in a width direction 40 of the magnetic layer 20 to a surface of the magnetic layer 20. Also, in FIGS. 2 and 3, it is possible to obtain a uniform distribution state of the magnetic particles by setting the variation ratio A to 10% or less. More specifically, the average particle diameter of the magnetic particles is set to 17 nm or less and the variation rate A is set to 10% or less, whereby it is possible to ensure a sufficient number of minute magnetic particles and to obtain a uniform distribution state of the magnetic particles in the lengthwise direction and the width direction of the magnetic layer. Accordingly, it is possible to obtain a preferable electromagnetic conversion property (SN property) even if the track width decreases due to the track density increasing accompanying an increase in the recording density for increasing the capacity.

A specific method for setting the variation rate A to 10% or less in the magnetic layer 13 will be described in detail in the later-described description of the method for manufacturing the magnetic recording medium of the present embodiment.

Lubricant Layer

Although not shown in FIG. 1, in order to reduce the friction coefficient of the magnetic layer 13 and further increase the durability of the magnetic layer 13, it is preferable to provide, on the magnetic layer 13, a lubricant layer containing a fluorine-based lubricant or a silicone-based lubricant. Examples of the above-described fluorine-based lubricant include trichlorofluoroethylene, perfluoropolyether, perfluoroalkyl polyether, and perfluoroalkyl carboxylic acid. Examples of the above-described silicone-based lubricant include silicone oil and modified silicone oil. These lubricants may be used alone or in combination. More specifically, for example, "Novec7100" or "Novec1720" (product name) manufactured by 3M Company can be used as the fluorine-based lubricant, and "KF-96L", "KF-96A", "KF-96", "KF-96H", "KF-99", "KF-50", "KF-54", "KF-965", "KF-968", "HIVAC F-4", "HIVAC F-5", "KF-56A", "KF995", "KF-69", "KF-410", "KF-412", "KF-414", and "FL" (product name) manufactured by Shin-Etsu Chemical Co., Ltd., and "BY16-846", "SF8416", "SH200", "SH203", "SH230", "SF8419", "FS1265", "SH510", "SH550", "SH710", "FZ-2110", and "FZ-2203" (product name) manufactured by Dow Corning Toray Co., Ltd. can be used as the silicone-based lubricant.

There is no particular limitation on the thickness of the lubricant layer, and it is sufficient that the thickness thereof is 3 to 5 nm, for example. The thickness of the lubricant layer can be measured using a method in which a TSA disclosed in JP 2012-43495A above is used, based on a difference in spacing between the magnetic recording medium and a transparent body before and after the lubricant layer is washed away using an organic solvent.

The lubricant layer can be formed by top-coating the magnetic layer 13 with the lubricant. As described above, the magnetic layer 13 is uniformly filled with minute magnetic particles, and thus the lubricants included in the magnetic layer 13 are unlikely to move to the surface of the magnetic layer 13. However, by top-coating in which the lubricants are applied to the surface of the magnetic layer, a lubricant layer can be reliably formed on the surface of the magnetic layer 13.

Undercoat Layer

The undercoat layer 12 having a lubricant retention function and an external stress (e.g., pressing force of the magnetic head) cushioning function is preferably provided under the magnetic layer 13. Also, by providing the undercoat layer 12, the strength of the magnetic recording medium 10 increases, and thus when the magnetic recording medium 10 is formed, calendering can be performed and the fillability of the magnetic layer 13 can be improved. The undercoat layer 12 contains nonmagnetic powder, a binder, and a lubricant.

Examples of the nonmagnetic powder included in the undercoat layer 12 include carbon black, titanium oxide, iron oxide, and aluminum oxide, and in general, carbon black is used alone, or carbon black and another nonmagnetic powder such as titanium oxide, iron oxide, or aluminum oxide are used mixed together. In order to form a smooth undercoat layer 12 by forming a coating film with little thickness unevenness, it is preferable to use nonmagnetic powder having a sharp particle size distribution. From the viewpoint of ensuring the uniformity, surface smoothness, rigidity, and conductivity of the undercoat layer 12, an average particle diameter of the above-described nonmagnetic powder is preferably 10 to 1000 nm and more preferably 10 to 500 nm, for example.

The particle shape of the nonmagnetic powder included in the undercoat layer 12 may be any of a spherical shape, a plate shape, a needle shape, and a spindle shape. An average long axial diameter of a needle-shaped or spindle nonmagnetic powder is preferably 10 to 300 nm and an average short axial diameter thereof is preferably 5 to 200 nm. An average particle diameter of a spherical nonmagnetic powder is preferably 5 to 200 nm and more preferably 5 to 100 nm. An average particle diameter of a plate-shaped nonmagnetic powder is preferably 10 to 200 nm in terms of the maximum plate diameter. Furthermore, in order to form the smooth undercoat layer 12 having little thickness unevenness, nonmagnetic powder having a sharp particle size distribution is preferably used.

A binder and a lubricant that are similar to those used in the above-described magnetic layer 13 are used as the binder and the lubricant that are included in the undercoat layer 12. The content of the above-described binder is preferably 7 to 50 parts by mass and more preferably 10 to 35 parts by mass with respect to 100 parts by mass of the above-described nonmagnetic powder. Also, the content of the above-described lubricant is preferably 2 to 6 parts by mass and more preferably 2.5 to 4 parts by mass with respect to 100 parts by mass of the above-described nonmagnetic powder.

When ε-iron oxide particles are used as the magnetic particles of the above-described magnetic layer 13, the saturation magnetization amount of the ε-iron oxide particles is ½ to ⅓ of the saturation magnetization amount of the conventional ferromagnetic hexagonal ferrite particles, and therefore the magnetic particles are contained in the undercoat layer if a servo signal with a long recording wavelength is to be recorded. For example, it is possible to use needle-shaped metal iron-based magnetic particles, plate-shaped hexagonal ferrite magnetic particles, granular iron nitride-based magnetic particles, or the like as the magnetic particles contained in the undercoat layer 12.

The thickness of the undercoat layer 12 is preferably 0.1 to 3 μm and more preferably 0.3 to 2 μm. By setting the thickness of the undercoat layer 12 in this range, a lubricant retention function and an external stress cushioning function can be maintained without unnecessarily increasing the total thickness of the magnetic recording medium 10.

Nonmagnetic Support Body

A nonmagnetic support body for a magnetic recording medium that has been used conventionally can be used as the nonmagnetic support body 11. Specific examples thereof include polyesters such as polyethylene terephthalate and polyethylene naphthalate, polyolefins, and films made of cellulose triacetate, polycarbonate, polyamide, polyimide, polyamide-imide, polysulfone, or aramid.

Although the thickness of the nonmagnetic support body 11 varies depending on the application, it is preferably 1.5 to 11 μm and more preferably 2 to 7 μm. If the thickness of the nonmagnetic support body 11 is 1.5 μm or more, the film formation property increases and a high strength can be obtained. On the other hand, if the thickness of the nonmagnetic support body 11 is 11 μm or less, the total thickness does not necessarily increase, and the recording capacity per reel of a magnetic tape can be increased, for example.

A Young's modulus in the longitudinal direction of the nonmagnetic support body 11 is preferably 5.8 GPa or more and more preferably 7.1 GPa or more. If the Young's modulus in the lengthwise direction of the nonmagnetic support body 11 is 5.8 GPa or more, the travel ability can be increased. Also, in a magnetic recording medium used in a helical scan system, a ratio (MD/TD) between the Young's modulus in the lengthwise direction (MD) and the Young's modulus in the width direction (TD) is preferably 0.6 to 0.8, more preferably 0.65 to 0.75, and even more preferably 0.7. If the ratio (MD/TD) is in the above-described range, it is possible to suppress variation (flatness) in the output from the entry side on which a magnetic head enters a track to the exit side on which the magnetic head exits the track. In a magnetic recording medium used in a linear recording system, a ratio (MD/TD) between the Young's modulus in the longitudinal direction (MD) and the Young's modulus (TD) in the width direction is preferably 0.7 to 1.3.

Back Coat Layer

A main surface (here, the lower surface) that is opposite to the main surface of the nonmagnetic support body 11 that is provided with the undercoat layer 12 is preferably provided with the back coat layer 14 for the purpose of increasing the travel ability or the like. The thickness of the back coat layer 14 is preferably 0.2 to 0.8 μm and more preferably 0.3 to 0.8 μm. If the back coat layer 14 is excessively thin, the back coat layer 14 has an insufficient travel ability increasing effect, and if it is excessively thick, the total thickness of the magnetic recording medium 10 increases, and the recording capacity per reel of a magnetic tape decreases, for example.

The back coat layer 14 preferably contains carbon black such as acetylene black, furnace black, or thermal black, for example. In general, carbon black with a smaller particle diameter and carbon black with a larger particle diameter whose particle diameters are different from each other are used in combination. The reason why these are used in combination is that the travel ability increasing effect increases.

Also, the back coat layer 14 contains a binder, and a binder that is similar to that used in the magnetic layer 13 and the undercoat layer 12 can be used as the binder. Among these, in order to reduce the friction coefficient and increase the travel ability of the magnetic head, it is preferable to use a cellulose-based resin and a polyurethane resin in combination.

For the purpose of increasing the strength, the back coat layer 14 preferably further contains iron oxide, alumina, and the like.

Next, a method for manufacturing a magnetic recording medium of the present embodiment will be described. In the method for manufacturing the magnetic recording medium of the present embodiment, for example, a magnetic layer formation coating material, an undercoat layer formation coating material, and a back coat layer formation coating material are produced by mixing layer formation components and solvents, and a magnetic layer is formed using a sequential multilayer coating method in which the undercoat layer is formed by applying the undercoat layer formation coating material to one side of a nonmagnetic support body and drying the undercoat layer formation coating material, and then the magnetic layer formation coating material is applied to the undercoat layer and dried, and the back coat layer is further formed by applying the back coat layer formation coating material to the other side of the nonmagnetic support body and drying the back coat layer formation coating material. Thereafter, calendering is performed on the entireties of the layers so as to obtain a magnetic recording medium.

Also, instead of the above-described sequential multilayer coating method, it is also possible to adopt a simultaneous multilayer coating method in which the magnetic layer formation coating material is applied to the undercoat layer formation coating material and dried after the undercoat layer formation coating material is applied to the one side of the nonmagnetic support body and before the undercoat layer formation coating material is dried.

There is no particular limitation on the method for applying the above-described coating materials, and gravure coating, roll coating, blade coating, extrusion coating, or the like can be used, for example.

The following methods are examples of methods for establishing a relationship in which $A \leq 10\%$ in the above-described magnetic layer in the case where, regarding the vertical reflectance during vertical incidence obtained from the refractive index n and the attenuation coefficient k of the obtained magnetic layer when linearly polarized light is irradiated at an irradiation angle of 70° to the surface of the magnetic layer, the vertical reflectance of the linearly polarized light in the lengthwise direction of the magnetic layer is set as RL, the vertical reflectance of the linearly polarized light in the width direction of the magnetic layer is set as RT, and the variation rate A (%) between RL and RT satisfies $A=|RL/RT-1|\times 100$. The following methods can be implemented alone or in combination.

(1) There is a method in which aggregation of the magnetic powder is reduced by connecting a continuous kneading apparatus in series behind a batch kneading apparatus, and then kneading and dispersing the magnetic powder. For example, the magnetic powder is first kneaded using the batch kneading apparatus with a solid concentration of 70 to 90 mass %, and a kneaded material is removed by adding a solvent after kneading to dilute the solid concentration to 50 to 69 mass %, whereafter the kneaded material obtained by performing kneading using the continuous kneading apparatus with a solid concentration of 25 to 50 mass % is dispersed using a sand mill. With this method, after the end of kneading, the solid concentration when the kneaded material is removed can be kept high, and thus aggregation of the magnetic powder can be suppressed in a dilution process in which a solvent is added after kneading using a high shear force, and a magnetic layer having a high magnetic powder density can be obtained.

(2) In the method in which the kneaded material is dispersed using a sand mill after being kneaded using the batch kneading apparatus, there is a method in which aggregation of the magnetic powder is reduced by performing a pressure preliminary dispersion treatment process before kneading. For example, a preparation treatment process is performed which includes a liquid mixture preparation process for preparing a liquid mixture that contains the magnetic powder, a binder, and an organic solvent and has a solid concentration of 15 mass % or less, a pressure preliminary dispersion treatment process for spraying the obtained liquid mixture from a nozzle in a pressed state using a high-pressure spray collision dispersion device, a concentration process for concentrating the obtained preliminary dispersion liquid, a kneading process for kneading the obtained concentrate and the binder in a state in which the solid concentration is 80 mass % or more, a dilution process for diluting the obtained kneaded material using a dilution component, and a dispersion treatment process for dispersing the obtained pre-dispersion slurry having a solid concentration of 10 to 50 mass % using a dispersion medium.

It is preferable that in the above-described kneading process, the preliminary dispersion liquid is concentrated such that the solid concentration is 80 mass % or more, and the shearing at the time of kneading is 70 N·m or more.

Also, examples of the high-pressure spray collision dispersion device used in the pressure preliminary dispersion treatment process include a dispersion device having a chamber that discharges the above-described liquid mixture from a small nozzle by applying pressure to the liquid mixture using a high-pressure flange pump, and a dispersion device having a chamber that sprays the liquid mixture from a plurality of opposed nozzles at a high speed and a high pressure so as to cause the mixture to undergo face-to-face collision. Specific examples include an Ultimizer, a homogenizer, and a Nanomizer. The pressure applied to spray the liquid mixture is preferably 50 MPa or more and more preferably 100 MPa or more. Treatments are preferably performed two times or more with consideration given to a viscosity difference before and after dispersion, the particle size distribution of objects that are dispersed, prevention of a short pass of the liquid mixture, and the like. A dispersion device provided with a disk (including those with perforations, incisions, grooves, or the like), a pin, and a ring on a stirring shaft, and a rotor rotary dispersion device (for example, Nanomill, Picomill, Sandmill, Dynomill, and the like), and the like can be used as a medium dispersion device used in the dispersion treatment process. Although the dispersion time depends on the components of the magnetic coating material and the applications, it is preferably 30 to 90 minutes in terms of the retention time.

(3) There is a method in which aggregation of the magnetic powder is reduced by applying a high shear force to the magnetic powder using a continuous kneading apparatus, kneading the magnetic powder, and then kneading the magnetic powder with an appropriate shear force for a long period of time using a batch kneading apparatus. For example, a magnetic layer can be manufactured through a kneading process for kneading magnetic powder and a binder resin with a first solid concentration using a continuous kneading apparatus, and pulverizing the magnetic powder as much as possible by applying a high shear force to the magnetic powder so as to obtain magnetic kneaded material, and a re-kneading process for kneading the kneaded magnetic material with a second solid concentration that is less than or equal to the first solid concentration using a batch kneading apparatus that is arranged in series with the continuous kneading apparatus, applying a shear force to a surface of the pulverized magnetic powder, and covering the pulverized magnetic powder with a binder resin, which is the binder, by causing the magnetic powder to adsorb the binder resin as much as possible in a state in which the binder resin is extended. At this time, it is preferable to set the first solid concentration in a range of 80 to 90 mass %, the second solid concentration in a range of 65 to 90 mass %, and the kneading time in a range of 30 to 240 minutes.

Use of this method makes it possible to knead magnetic powder with a high shear force applied using the above-described continuous kneading apparatus, and to knead a magnetic kneaded material well while taking time using the above-described batch kneading apparatus, and thus magnetic powder sufficiently adsorbs the binder resin, the degree of dispersion of constituents such as magnetic powder for the magnetic coating material increases in the dispersion process, and a magnetic layer having a high magnetic powder density can be obtained.

(4) The dispersion time in the sand mill can be shortened by increasing the degree of dispersion in the kneading process using the above-described methods (1) to (3), and thus the occurrence of contamination caused by mixing of bead abrasion powder can be reduced and a magnetic layer having a high magnetic powder density can be obtained.

Also, using a centrifugation process using a centrifuge after the sand mill dispersion and dilution process makes it possible to remove magnetic powder having a predetermined particle size or more, and thus aggregates and undispersed substances are removed and a uniform magnetic coating material can be obtained. It is preferable to perform the centrifugation process at an acceleration of 1000 to 20000 G.

Also, a magnetic coating material having a more stable dispersiveness can be obtained by including the re-dispersion process in which the magnetic powder is further dispersed using a collision dispersion device, after the above-described dispersion process. A collision dispersion device that can be used at a high pressure of 50 to 250 MPa is preferable.

(5) There is a method in which a fine magnetic layer is obtained by slowly drying in the application/drying process. In particular, if thin layers of magnetic coating material are applied and dried through sequential multilayer coating, the solvent dries due to the magnetic layers quickly drying, and thereby the magnetic layer tends to be coarse. In view of this, by increasing the solvent concentration of air in a dry area so as to slow the drying speed and slowly drying the magnetic layers, a magnetic layer having a high magnetic powder density can be obtained.

Specifically, in the magnetic layer application/drying process, it is preferable to perform a preheating process for heating a magnetic coating film until the surface temperature of the magnetic coating film stops increasing and the temperature reaches an approximately constant temperature, a constant-rate drying process that is performed after the preheating process and in which the surface temperature of the magnetic coating film is kept approximately constant, and a reduced-rate drying process that is performed after the constant-rate drying process and in which the surface temperature of the magnetic coating film becomes higher than the temperature at which the constant-rate drying process is performed so as to solidify the magnetic coating film, and it is preferable to set the constant-rate drying period to 0.2 seconds or more.

(6) As a method other than the above-described methods, by applying a magnetic coating material with a high solid concentration S/S, the amount of a solvent that evaporates during drying is reduced, and a finer magnetic layer can be formed.

Recording/Reproduction Mechanism for High Recording Density Magnetic Recording Medium Next, an embodiment of a recording/reproduction mechanism for a high recording density magnetic recording medium of the present invention will be described.

The recording/reproduction mechanism for the high recording density magnetic recording medium of the present invention includes the high recording density magnetic recording medium of the above-described embodiment and a TMR head. As described above, the high recording density magnetic recording medium can improve the electromagnetic conversion property, but it is possible to obtain a more preferable electromagnetic conversion property (SN property) by further combining a high-sensitivity TMR head therewith.

Also, the TMR head has a high sensitivity, and by combining it with minute particles of ε-iron oxide, a high SN ratio can be obtained, but since the TMR head has a high sensitivity, if the spacing with the magnetic layer is small, thermal asperity noise (cooling noise) that occurs due to the TMR element instantaneously cooling due to heat dissipation caused by contact between the TMR head and protrusions on the magnetic layer, is more likely to occur. However, as described above, if the spacing of the surface of the above-described magnetic layer is measured with a TSA (tape spacing analyzer) after the surface of the magnetic layer of the magnetic recording medium is cleaned with n-hexane, the value of the spacing is 5 nm or more and 12 nm or less, whereby the thermal asperity noise can be reduced.

Hereinafter, the present invention will be described using working examples, but the present invention is not limited to the following working examples. Also, "parts" refers to "parts by mass" in the description below.

Working Example 1

Preparation of Magnetic Coating Material

A mixture was prepared by mixing magnetic coating material components (1) shown in Table 1 at a high speed using a high-speed stirring mixer. Next, after the obtained mixture was subjected to dispersion treatment using a sand mill for 250 minutes, magnetic coating material components (2) shown in Table 2 were added so as to prepare a dispersion liquid. Next, the obtained dispersion liquid and magnetic coating material components (3) shown in Table 3 were stirred using a disperser, and filtered using a filter so as to prepare a magnetic coating material. The solid concentration S/S of the above-described magnetic coating material was 23 mass %.

TABLE 1

| Magnetic coating material components (1) | parts |
|---|---|
| ε-$Fe_2O_3$ magnetic powder, average particle diameter: 14 nm | 100 |
| Vinyl chloride-based copolymer (containing $SO_3K$ group), "MR104" manufactured by Zeon Corporation | 13.5 |
| Polyurethane resin (containing $SO_3Na$ group, glass transition temperature: 70° C.) "UR8200" manufactured by TOYOBO CO., LTD. | 8 |
| Carbon black (average particle diameter: 75 nm) | 2 |
| Particulate alumina powder (average particle diameter: 80 nm) | 8 |
| Cyclohexanone | 120 |
| Toluene | 120 |

TABLE 2

| Magnetic coating material components (2) | parts |
|---|---|
| n-Butyl stearate | 1 |
| Cyclohexanone | 65 |
| Methyl ethyl ketone | 65 |
| Toluene | 65 |

TABLE 3

| Magnetic coating material components (3) | parts |
|---|---|
| Polyisocyanate | 3.5 |
| Cydohexanone | 7 |
| Toluene | 7 |

Preparation of Undercoating Material

A kneaded material was prepared by kneading undercoating material components (1) shown in Table 4 using a batch kneader. Next, the obtained kneaded material and undercoating material components (2) shown in Table 5 were stirred using a disperser so as to prepare a liquid mixture. Next, a dispersion liquid was prepared by dispersing the obtained liquid mixture using a sand mill for 100 minutes, and then the dispersion liquid and undercoating material components (3) shown in Table 6 were stirred using a disperser and filtered using a filter so as to prepare an undercoating material.

TABLE 4

| Undercoating material components (1) | parts |
|---|---|
| Needle-shaped iron oxide (average longer axis length: 110 nm) | 79 |
| Carbon black (average particle diameter: 17 nm) | 18 |
| Particulate alumina powder (average particle diameter: 140 nm) | 3 |
| Vinyl chloride-hydroxypropyl acrylate copolymer (containing $SO_3Na$ group) | 9 |
| Polyurethane resin (containing $SO_3Na$ group, glass transition temperature: 20° C.) "U18300" manufactured by TOYOBO CO., LTD. | 7.5 |

TABLE 4-continued

| Undercoating material components (1) | parts |
| --- | --- |
| Cyclohexanone | 120 |
| Methyl ethyl ketone | 60 |
| Toluene | 60 |

TABLE 5

| Undercoating material components (2) | parts |
| --- | --- |
| Stearic acid | 1 |
| n-Butyl stearate | 1.5 |
| Cydohexanone | 120 |
| Toluene | 120 |

TABLE 6

| Undercoating material components (3) | parts |
| --- | --- |
| Polyisocyanate | 4.5 |
| Cyclohexanone | 7 |
| Toluene | 7 |

Preparation of Coating Material for Back Coat Layer

A liquid mixture obtained by mixing coating material components for a back coat layer shown in Table 7 was dispersed using a sand mill for 50 minutes so as to prepare a dispersion liquid. 15 parts of polyisocyanate were added to the obtained dispersion liquid, stirred, and filtered using a filter so as to prepare a coating material for a back coat layer.

TABLE 7

| Coating material components for back coat layer | parts |
| --- | --- |
| Carbon black (average particle diameter: 25 nm) | 80 |
| Carbon black (average particle diameter: 300 nm) | 10 |
| α-Hematite powder (average particle diameter: 100 nm) | 10 |
| Nitrocellulose | 45 |
| Polyurethane resin (containing SO3Na group, glass transition temperature: 20° C.) "UR8300" manufactured by TOYOBO CO., LTD. | 30 |
| Cydohexanone | 300 |
| Methyl ethyl ketone | 500 |
| Toluene | 500 |

Preparation of Magnetic Tape for Evaluation

An undercoat layer was formed by applying the above-described undercoating material onto a nonmagnetic support body (polyethylene naphthalate film, thickness: 5 μm) such that the thickness of the undercoat layer after calendering was 1.1 μm, and drying the undercoating material at 100° C. Next, a magnetic layer was formed by applying the above-described magnetic coating material onto the above-described undercoat layer using a die coater with a coater tension of 4.5 N/inch such that the thickness of a magnetic layer after calendering was 55 nm, and drying the magnetic coating material at 100° C. During the drying step, vertical orientation treatment was performed while an oriented magnetic field (450 kA/m) was applied using N-S opposing magnets.

Next, the back coat layer was formed by applying the back coat layer coating material on the surface of the nonmagnetic support body opposite to the surface on which the undercoat layer and the magnetic layer were formed, such that the thickness after calendering was 0.5 μm, and drying the back coat layer forming coating material at 100° C.

Thereafter, a web roll obtained by forming the undercoat layer and the magnetic layer on the upper surface side of the nonmagnetic support body and forming the back coat layer on the lower surface side was subjected to calendering at a temperature of 100° C. and a linear pressure of 300 kg/cm, using a calender apparatus having 7 metal rolls.

Finally, a magnetic sheet was obtained by subjecting the obtained web roll to hardening processing at 60° C. for 48 hours. This magnetic sheet was cut to a width of ½ inch, whereby the magnetic tape for evaluation of Working Example 1 was prepared.

Working Example 2

The magnetic tape for evaluation of Working Example 2 was prepared similarly to Working Example 1, except that the magnetic coating material produced in Working Example 1 was applied such that the thickness of the magnetic layer after calendering was 135 nm.

Working Example 3

The magnetic layer was formed by applying the magnetic coating material produced in Working Example 1 such that the thickness of the magnetic layer after calendering was 85 nm, and drying the magnetic coating material at 100° C. During the drying step, the magnetic tape for evaluation of Working Example 3 was produced similarly to that in Working Example 1, except that vertical orientation treatment was performed while applying an oriented magnetic field (900 kA/m).

Working Example 4

The magnetic tape for evaluation of Working Example 4 was produced similarly to that in Working Example 1, except that the average particle diameter of the ε-$Fe_2O_3$ magnetic powder in the magnetic coating material components (1) shown in Table 1 was changed to 16 nm.

Working Example 5

The magnetic tape for evaluation of Working Example 5 was produced similarly to that in Working Example 1, except that the magnetic coercive force of the ε-$Fe_2O_3$ magnetic powder in the magnetic coating material components (1) shown in Table 1 was changed to 2800 [Oe].

Working Example 6

The magnetic tape for evaluation of Working Example 6 was produced similarly to that in Working Example 1, except that the magnetic coating material produced in Working Example 1 was applied such that the thickness of the magnetic layer after calendering was 85 nm and a web roll obtained by forming the undercoat layer and the magnetic layer on the upper surface side of the nonmagnetic support body and forming the back coat layer on the lower surface side was subjected to calendering at a temperature of 90° C. and a linear pressure of 300 kg/cm using the calender apparatus including 7 metal rolls.

Working Example 7

The magnetic tape for evaluation of Working Example 7 was prepared similarly to Working Example 1, except that the magnetic coating material produced in Working Example 1 was applied such that the thickness of the magnetic layer after calendering was 43 nm.

Working Example 8

The magnetic tape for evaluation of Working Example 8 was prepared similarly to Working Example 1, except that the magnetic coating material produced in Working Example 1 was applied such that the thickness of the magnetic layer after calendering was 145 nm.

Working Example 9

The magnetic layer was formed by applying the magnetic coating material produced in Working Example 1 such that the thickness of the magnetic layer after calendering was 85 nm, and drying the magnetic coating material at 100° C. The magnetic tape for evaluation of Working Example 9 was produced similarly to that in Working Example 1, except that during the drying step, vertical orientation treatment was performed while applying an oriented magnetic field (100 kA/m).

Comparative Example 1

The magnetic tape for evaluation of Comparative Example 1 was produced similarly to that in Working Example 1, except that the average particle diameter of the ε-$Fe_2O_3$ magnetic powder in the magnetic coating material components (1) shown in Table 1 was changed to 18 nm.

Comparative Example 2

The magnetic tape for evaluation of Comparative Example 2 was prepared similarly to that in Working Example 1, except that the amounts of the cyclohexanone, methyl ethyl ketone, and toluene in the solvent components of the magnetic coating material components (2) were changed to 100 parts each, the solid portion concentration of the magnetic coating material was set to 20%, the coater tension of the die coater was set to 2.5 N/inch, and the magnetic coating material was applied.

Comparative Example 3

The magnetic tape for evaluation of Comparative Example 3 was produced similarly to that in Working Example 1, except that the ε-$Fe_2O_3$ magnetic powder in the magnetic coating material components (1) shown in Table 1 was changed to iron nitride magnetic powder with an average particle diameter of 17 nm and a magnetic coercive force of 3000 [Oe].

Next, the following properties were measured using the produced magnetic tape for evaluation.

Variation Rate of Reflectance

Using an automatic ellipsometer "DHA-XAVW/S6" (product name) manufactured by Mizojiri Optical Co., linearly polarized light with a wavelength of 546 nm was irradiated at an irradiation angle of 70° from the lengthwise direction and the width direction of the magnetic layer to the surface of the magnetic layer of the magnetic tape for evaluation, the refractive index n and the attenuation coefficient k of the magnetic layer were obtained in the lengthwise direction and the width direction, and the vertical reflectance R during vertical incidence was calculated using the following equation.

$$R=[(n-1)^2+k^2]/[(n+1)^2+k^2]$$

Regarding the vertical reflectance obtained using the above-described equation, the vertical reflectance of the linearly polarized light in the lengthwise direction of the magnetic layer is RL, and the vertical reflectance of the linearly polarized light in the width direction of the magnetic layer is RT, and the variation rate A (%) was calculated using the following equation.

$$A=|RL/RT-1|\times100$$

In the measurement of the variation rate A, the beam diameter of the light being irradiated was about 2.81 mm in the longer axis direction and about 0.96 mm in the shorter axis direction at the irradiation angle 70°. For example, in the case of using an LTO6 head, there are 16 channels (CH), and 16 head elements are aligned at intervals of 167 µm in a width of about 2.5 mm. Accordingly, if light is irradiated in the width direction of the magnetic tape, the beam diameter of the light in the width direction is about 2.81 mm, and the reflectance in a region with approximately the same length as the length of about 2.5 mm of the region in which the head elements are aligned is evaluated.

Mr·t in Thickness Direction of Magnetic Layer, Magnetic Coercive Force, and Squareness Ratio A hysteresis curve of the magnetic tape for evaluation was obtained using a vibrating specimen magnetometer "VSM-P7" (product name) manufactured by Toei Industry Co., Ltd. Mr·t in the thickness direction of the magnetic layer, the magnetic coercive force, and the squareness ratio were obtained based on the above-described hysteresis curve. Specifically, cut samples were obtained by cutting the magnetic tape for evaluation into circles with diameters of 8 mm, and a measurement sample was obtained by stacking 20 cut samples with the thickness direction of the magnetic tape coinciding with the direction of applying the external magnetic field. As a plot mode of the data from the vibrating specimen magnetometer, the applied magnetic field was set to −16 kOe to 16 kOe, a time constant TC was set to 0.03 seconds, the drawing step was set to 6 bits, and the wait time was set to 0.3 seconds.

Spacing of Magnetic Layer

Spacing was measured using a TSA (tape spacing analyzer) manufactured by Micro Physics after the surface of the magnetic layer was cleaned using n-hexane.

Specifically, the pressure at which the magnetic layer was pressed against a glass plate using a urethane hemisphere was 0.5 atm ($5.05\times10^4$ N/m). A certain region (240000 to 280000 µm$^2$) of the surface of the magnetic tape for evaluation on the magnetic layer side was irradiated through the glass plate with white light from a stroboscope in that state, the light reflected therefrom passed through an IF filter (633 nm) and an IF filter (546 nm) and was received by a CCD, and thereby an interference fringe image caused by the unevenness of that region was obtained.

Next, that image was divided into 66000 points and distances from the glass plate to the surface of the magnetic layer at the points were obtained and made into a histogram (frequency distribution curve), a smooth curve was obtained through low-pass filter (LPF) processing, and the distance from the glass plate to the surface of the magnetic layer at the peak position was obtained as the spacing.

Also, optical constants (phase, reflectance) of the surface of the magnetic layer that were used in the calculation of the spacing were measured using a reflective spectral film thickness meter "FE-3000" (product name) manufactured by Otsuka Electronics Co., Ltd., and values near a wavelength of 546 nm were used.

Cleaning using n-hexane was performed by immersing the magnetic tape for evaluation in n-hexane and performing ultrasonic cleaning for 30 minutes.

the output properties (SN ratios) of a head with four CH (CH1, CH6, CH11, CH16) at different positions in the width direction, which are arranged at equal intervals about 835 μm apart from each other, the output properties each measured using the method for evaluating the output property.

The results of the above evaluation are shown in Table 8.

TABLE 8

| | Magnetic particle average particle diameter (nm) | Variation rate A of reflectance (%) | Mr · t (μT · m) | Squareness ratio in thickness direction | Magnetic oercive force in thickness direction (Oe) | TSA spacing (nm) | Output SN ratio (dB) | Head-CH deviation (dB) |
|---|---|---|---|---|---|---|---|---|
| Working Ex. 1 | 14 | 7 | 0.0013 | 0.70 | 3200 | 10 | 0.9 | 0.8 |
| Working Ex. 2 | 14 | 5 | 0.0032 | 0.70 | 3200 | 10 | 0.5 | 0.6 |
| Working Ex. 3 | 14 | 4 | 0.0020 | 0.75 | 3300 | 10 | 1.6 | 0.6 |
| Working Ex. 4 | 16 | 6 | 0.0020 | 0.70 | 3200 | 10 | 1.0 | 0.6 |
| Working Ex. 5 | 14 | 5 | 0.0020 | 0.70 | 2800 | 10 | 1.2 | 0.7 |
| Working Ex. 6 | 14 | 8 | 0.0020 | 0.70 | 3200 | 14 | 0.6 | 0.8 |
| Working Ex. 7 | 14 | 10 | 0.0010 | 0.70 | 3200 | 10 | 0.0 | 0.9 |
| Working Ex. 8 | 14 | 6 | 0.0034 | 0.70 | 3200 | 10 | 0.1 | 0.7 |
| Working Ex. 9 | 14 | 7 | 0.0020 | 0.63 | 3100 | 10 | 0.3 | 0.7 |
| Comp. Ex. 1 | 18 | 8 | 0.0020 | 0.70 | 3200 | 10 | −0.5 | 1.1 |
| Comp. Ex. 2 | 14 | 11 | 0.0020 | 0.70 | 3200 | 10 | −0.2 | 1.3 |
| Comp. Ex. 3 | 17 | 15 | 0.0032 | 0.70 | 3000 | 10 | −0.3 | 1.5 |

Output Properties

An inducible/GMR complex magnetic head having a writing track width of 5 μm and a readout track width of 2.3 μm was attached to a linear tape electromagnetic conversion property measurement apparatus that was produced by modifying an LTO drive, and evaluation was performed by recording signals having a recording wavelength of 200 nm (G7×1.05-fold linear recording density) in the magnetic tape for evaluation at a tape speed of 1.5 msec.

This apparatus had a traveling system in which magnetic heads were attached at two locations, and thus two of the above-described magnetic heads were attached. The magnetic heads were placed on a precise piezo stage (having a movement resolution 10 nm) that was movable in the track width direction, the upstream magnetic head recorded signals and the downstream magnetic head performed AC erasure in one instance of traveling, and signals with a magnetization width (length of magnetization in the width direction of the magnetic layer) of 0.8 μm were recorded on the magnetic tape for evaluation by offsetting the upstream magnetic head and the downstream magnetic head by 0.8 μm in the track width direction.

Next, the signals were reproduced by once again causing the magnetic tape for evaluation to travel and the reproduced signals were amplified using a commercially-available read amplifier for an MR head, whereafter a fundamental wave component output (S) of the signals and integral noise (N) up to twice the frequency thereof were measured using a spectrum analyzer "N9020A" (product name) manufactured by Keysight Technologies, and with the S/N ratio of Working Example 7 being used as a reference (0 dB), the other S/N ratios were indicated as relative values (dB) to the S/N ratio of Working Example 7.

Deviation in the Output Properties (SN Ratios) Between the Head-Channels

In order to evaluate variation in the output properties (SN ratios) in the tape width direction, deviation between the head-channels (hereinafter referred to as "head-CH deviation") in the output properties (SN ratios) was measured using a 16-channel (CH) LTO6 head manufactured by Hewlett-Packard Co. The head-CH deviation is the difference between the maximum value and the minimum value of Based on Table 8, it is understood that the output properties (SN ratios) are large and the head-CH deviations are small in Working Examples 1 to 9. Accordingly, the head-CH output properties were increased and the deviation was reduced in multi-channel heads with narrow track width of 1 μm or less. In contrast to this, in Comparative Example 1 in which the average particle diameter of the magnetic particles exceeded 17 nm and Comparative Examples 2 and 3 in which the variation rate A of the reflectance exceeded 10%, all of the output properties (SN ratios) were low. Also, according to Comparative Examples 2 and 3, it is also understood that if the value of the variation rate A of the reflectance is large, the head-CH deviation will also be large.

The present invention can be implemented in modes other than those described above, without departing from the gist of the invention. The embodiments disclosed in the present application are exemplary and there is no limitation thereto. The scope of the present invention is to be interpreted with priority given to the description of the attached claims rather than the description of the specification above, and all changes that are equivalent to the claims are included in the claims.

What is claimed is:

1. A high recording density magnetic recording medium comprising a nonmagnetic support body and a magnetic layer including magnetic particles, wherein
   an average particle diameter of the magnetic particles is 17 nm or less,
   a refractive index nL and an attenuation rate kL of the magnetic layer are obtained by irradiating linearly polarized light at an irradiation angle of 70° from a lengthwise direction of the magnetic layer to the surface of the magnetic layer, and a vertical reflectance RL during vertical incidence of the linearly polarized light in the lengthwise direction is obtained from nL and kL,
   a refractive index nT and an attenuation rate kT of the magnetic layer are obtained by irradiating linearly polarized light at an irradiation angle of 70° from a width direction of the magnetic layer to the surface of the magnetic layer, and a vertical reflectance RT during vertical incidence of the linearly polarized light in the width direction is obtained from nT and kT, if a variation rate A (%) of RL and RT is $A=|RL/RT-1|\times 100$, a relationship $A \leq 10\%$ is established, and a squareness ratio in a thickness direction of the magnetic layer is 0.63 or more and 0.75 or less.

2. The high recording density magnetic recording medium according to claim 1, wherein if a length of magnetization of a signal recorded on the magnetic layer is 1 µm or less, the length of magnetization being in the width direction of the magnetic layer, reproduction is performed with a TMR head.

3. The high recording density magnetic recording medium according to claim 1, wherein $0.0013 \text{ µT·m} < Mr \cdot t < 0.0032 \text{ µT·m}$ is satisfied, where a residual magnetic flux density in a thickness direction of the magnetic layer is Mr and an average thickness of the magnetic layer is t.

4. The high recording density magnetic recording medium according to claim 1, wherein the magnetic particles contain ε-iron oxide particles.

5. The high recording density magnetic recording medium according to claim 1, wherein a magnetic coercive force in the thickness direction of the magnetic layer is 3000 oersteds [Oe] or more.

6. The high recording density magnetic recording medium according to claim 1, wherein when the surface of the magnetic layer is cleaned using n-hexane and thereafter spacing on the surface of the magnetic layer is measured using a TSA (Tape Spacing Analyzer), a value of the spacing is 5 nm or more and 12 nm or less.

7. The high recording density magnetic recording medium according to claim 1, wherein a thickness of the magnetic layer is 30 nm or more and 200 nm or less.

8. A recording/reproduction mechanism for a high recording density magnetic recording medium, comprising:

the high recording density magnetic recording medium according to claim 1, and a TMR head.

* * * * *